United States Patent
Rong et al.

(10) Patent No.: US 11,997,719 B2
(45) Date of Patent: May 28, 2024

(54) SYSTEM AND METHOD FOR COMMUNICATIONS USING SUPPLEMENTARY UPLINK

(71) Applicant: Huawei Technologies Co., Ltd., Shenzhen (CN)

(72) Inventors: Zhigang Rong, San Diego, CA (US); Le Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 17/279,465

(22) PCT Filed: Apr. 28, 2019

(86) PCT No.: PCT/CN2019/084806
§ 371 (c)(1),
(2) Date: Mar. 24, 2021

(87) PCT Pub. No.: WO2020/062860
PCT Pub. Date: Apr. 2, 2020

(65) Prior Publication Data
US 2021/0410190 A1  Dec. 30, 2021

Related U.S. Application Data

(60) Provisional application No. 62/736,886, filed on Sep. 26, 2018.

(51) Int. Cl.
*H04W 74/0833* (2024.01)
*H04L 43/16* (2022.01)
(Continued)

(52) U.S. Cl.
CPC ......... *H04W 74/0833* (2013.01); *H04L 43/16* (2013.01); *H04W 24/08* (2013.01); *H04W 64/00* (2013.01)

(58) Field of Classification Search
CPC . H04W 74/0833; H04W 24/08; H04W 64/00; H04W 36/30; H04W 36/24; H04L 43/16
See application file for complete search history.

(56) References Cited

U.S. PATENT DOCUMENTS

2019/0254074 A1* 8/2019 Jeon ................. H04W 36/0085
2020/0008242 A1* 1/2020 Lee .................... H04W 74/004
(Continued)

FOREIGN PATENT DOCUMENTS

CN  108370574 A  8/2018
CN  108521883 A  9/2018
(Continued)

OTHER PUBLICATIONS

3GPP TSG-RAN WG2 NR AH#3; Tdoc; R2-1800686; Source: Ericsson; Title: Random Access Fallback to SUL; Vancouver, Canada, Jan. 22-26, 2018. (Year: 2018).*
(Continued)

*Primary Examiner* — Mohammed S Chowdhury
(74) *Attorney, Agent, or Firm* — Slater Matsil, LLP

(57) ABSTRACT

A computer-implemented method for operating a user equipment (UE) includes measuring a channel quality of a channel associated with a first uplink channel and a second uplink channel, determining that the channel quality is between a first channel quality threshold and a second channel quality threshold, and based thereon, selecting either the first uplink channel or the second uplink channel for an uplink transmission in accordance with a current location of the UE, historical information of successful uplink channel access attempts, and a distance threshold, and performing an uplink random access procedure in accordance with the selected uplink channel.

24 Claims, 6 Drawing Sheets

(51) Int. Cl.
*H04W 24/08* (2009.01)
*H04W 64/00* (2009.01)

(56) References Cited

U.S. PATENT DOCUMENTS

| | | | |
|---|---|---|---|
| 2020/0053799 A1* | 2/2020 | Jeon | H04W 16/14 |
| 2020/0305200 A1 | 9/2020 | Jiang | |
| 2020/0396654 A1* | 12/2020 | Freda | H04W 36/08 |
| 2021/0153253 A1* | 5/2021 | Wang | H04W 72/02 |
| 2021/0315020 A1* | 10/2021 | Jiang | H04W 74/0833 |
| 2022/0417804 A1* | 12/2022 | Freda | H04W 36/30 |

FOREIGN PATENT DOCUMENTS

| | | |
|---|---|---|
| EP | 3783959 A1 | 2/2021 |
| WO | 2017172100 A1 | 10/2017 |

OTHER PUBLICATIONS

3GPP TSG-RAN WG2 Meeting #103; R2-1811480; Source: ZTE, Sanechips; Title: Considering on the RA triggered BWP switch in case SUL is configured; Gothenburg, Sweden, Aug. 20-24, 2018. (Year: 2018).*

3GPP TSG-RAN WG2 Meeting #101; R2-1802827; Source: InterDigital Inc.; Title: SUL Operation in NR Standalone; Athens, Greece, Feb. 26-Mar. 2, 2018. (Year: 2018).*

3GPP TSG-RAN WG2 AH 1807; Tdoc; R2-1810067; Source: Ericsson; Title: Switch between SUL and NUL during ongoing RA procedure; Montreal, Canada, Jul. 2-6, 2018. (Year: 2018).*

Provisional (U.S. Appl. No. 62/687,816) of Wang (2021/0153253)—Specification, filed Jun. 21, 2018 before the EFD of the instant application. (Year: 2018).*

Provisional (U.S. Appl. No. 62/687,816) of Wang (2021/0153253)—Drawings, filed Jun. 21, 2018 before the EFD of the instant application. (Year: 2018).*

Ericsson, "Switch between SUL and NUL during ongoing RA procedure," 3GPP TSG-RAN WG2 AH 1807, Tdoc R2-1810067, Agenda Item 10.3.1.13, Montreal, Canada, Jul. 2-6, 2018, 2 pages.

Tl, "Discussion on RACH carrier selection for Nr-U," 3GPP Tsg-Ran WG2 Meeting #103, R2-1812813, Agenda tem 7.1.1.2, Gothenburg, Sweden, Aug. 20-24, 2018, 2 pages.

* cited by examiner

SYSTEM AND METHOD FOR COMMUNICATIONS USING SUPPLEMENTARY UPLINK

CROSS-REFERENCE TO RELATED APPLICATIONS

This application is a national phase filing under section 371 of PCT/CN2019/084806, filed Apr. 28, 2019, which claims priority to U.S. Provisional Patent Application No. 62/736,886 filed Sep. 26, 2018 and titled "System and Method for Communications Using Supplementary Uplink," each of which is incorporated herein by reference in its entirety.

TECHNICAL FIELD

The present disclosure relates generally to a system and method for digital communications, and, in particular embodiments, to a system and method for communications using supplementary uplink.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies.

In general, transmissions at high operating frequencies have greater pathloss than transmission at low operating frequencies. Hence, a transmission at a lower operating frequency will typically have greater coverage than a transmission at a higher operating frequency, given that the two transmissions are transmitting at approximately the same transmission power. Furthermore, because access nodes do not operate under power consumption restrictions, the coverage of downlink transmissions is normally larger than the coverage of uplink transmissions. Therefore, there is a need for systems and methods for communications using supplementary uplink.

SUMMARY

According to a first aspect, a computer-implemented method for operating a user equipment (UE) is provided. The computer-implemented method includes measuring, by the UE, a channel quality of a channel associated with a first uplink channel and a second uplink channel, and determining, by the UE, that the channel quality is between a first channel quality threshold and a second channel quality threshold, and based thereon, selecting, by the UE, either the first uplink channel or the second uplink channel for an uplink transmission in accordance with a current location of the UE, historical information of successful uplink channel access attempts, and a distance threshold, and performing, by the UE, an uplink random access procedure in accordance with the selected uplink channel.

In a first implementation form of the computer-implemented method according to the first aspect as such, wherein the historical information comprises UE locations of successful uplink channel access attempts for the first uplink channel.

In a second implementation form of the computer-implemented method according to the first aspect as such or any preceding implementation form of the first aspect, wherein selecting either the first uplink channel or the second uplink channel comprises determining, by the UE, that a distance between the current location of the UE and any stored UE location in the historical information is smaller than the distance threshold, and based thereon selecting, by the UE, the first uplink channel.

In a third implementation form of the computer-implemented method according to the first aspect as such or any preceding implementation form of the first aspect, wherein selecting either the first uplink channel or the second uplink channel comprises determining, by the UE, that a distance between the current location of the UE and all stored UE location in the historical information is greater than or equal to the distance threshold, and based thereon selecting, by the UE, the second uplink channel.

In a fourth implementation form of the computer-implemented method according to the first aspect as such or any preceding implementation form of the first aspect, wherein the historical information comprises historical information of successful uplink channel access attempts for the second uplink channel.

In a fifth implementation form of the computer-implemented method according to the first aspect as such or any preceding implementation form of the first aspect, wherein selecting either the first uplink channel or the second uplink channel comprises determining, by the UE, that a distance between the current location of the UE and any stored UE location in the historical information is smaller than the distance threshold, and based thereon selecting, by the UE, the second uplink channel.

In a sixth implementation form of the computer-implemented method according to the first aspect as such or any preceding implementation form of the first aspect, wherein selecting either the first uplink channel or the second uplink channel comprises determining, by the UE, that a distance between the current location of the UE and all stored UE location in the historical information is greater than or equal to the distance threshold, and based thereon selecting, by the UE, the first uplink channel.

In a seventh implementation form of the computer-implemented method according to the first aspect as such or any preceding implementation form of the first aspect, further comprising determining, by the UE, the current location of the UE from at least one of global positioning system (GPS) signals, information from IEEE 802.11 compliant devices, IEEE 802.11 compliant signals, or Bluetooth signals.

In an eighth implementation form of the computer-implemented method according to the first aspect as such or any preceding implementation form of the first aspect, further comprising, prior to determining that the channel quality is between a first channel quality threshold and a second channel quality threshold, selecting, by the UE, a first one of the first uplink channel or the second uplink channel when the channel quality is less than the first channel quality threshold, and selecting, by the UE, a second one of the first uplink channel or the second uplink channel when the channel quality is greater than the second channel quality threshold.

In a ninth implementation form of the computer-implemented method according to the first aspect as such or any preceding implementation form of the first aspect, wherein the first uplink channel and the second uplink channel are in different frequency bands.

In a tenth implementation form of the computer-implemented method according to the first aspect as such or any preceding implementation form of the first aspect, further comprising retrieving, by the UE, an update of the historical information of successful uplink channel access attempts from a server.

In an eleventh implementation form of the computer-implemented method according to the first aspect as such or any preceding implementation form of the first aspect, further comprising updating, by the UE, the historical information of successful uplink channel access attempts when the uplink random access procedure is successful.

According to a second aspect, a UE is provided. The UE includes a non-transitory memory storage comprising instructions, and one or more processors in communication with the memory storage. The one or more processors execute the instructions to measure a channel quality of a channel associated with a first uplink channel and a second uplink channel, determine that the channel quality is between a first channel quality threshold and a second channel quality threshold, and based thereon, select either the first uplink channel or the second uplink channel for an uplink transmission in accordance with a current location of the UE, historical information of successful uplink channel access attempts, and a distance threshold, and perform an uplink random access procedure in accordance with the selected uplink channel.

In a first implementation form of the UE according to the second aspect as such, wherein the historical information comprises UE locations of successful uplink channel access attempts for the first uplink channel.

In a second implementation form of the UE according to the second aspect as such or any preceding implementation form of the second aspect, wherein the one or more processors further execute the instructions to determine that a distance between the current location of the UE and any stored UE location in the historical information is smaller than the distance threshold, and based thereon select the first uplink channel.

In a third implementation form of the UE according to the second aspect as such or any preceding implementation form of the second aspect, wherein the one or more processors further execute the instructions to determine that a distance between the current location of the UE and all stored UE location in the historical information is greater than or equal to the distance threshold, and based thereon select the second uplink channel.

In a fourth implementation form of the UE according to the second aspect as such or any preceding implementation form of the second aspect, wherein the historical information comprises historical information of successful uplink channel access attempts for the second uplink channel.

In a fifth implementation form of the UE according to the second aspect as such or any preceding implementation form of the second aspect, wherein the one or more processors further execute the instructions to determine that a distance between the current location of the UE and any stored UE location in the historical information is smaller than the distance threshold, and based thereon select the second uplink channel.

In a sixth implementation form of the UE according to the second aspect as such or any preceding implementation form of the second aspect, wherein the one or more processors further execute the instructions to determine that a distance between the current location of the UE and all stored UE location in the historical information is greater than or equal to the distance threshold, and based thereon select the first uplink channel.

In a seventh implementation form of the UE according to the second aspect as such or any preceding implementation form of the second aspect, wherein the one or more processors further execute the instructions to determine the current location of the UE from at least one of global positioning system (GPS) signals, information from IEEE 802.11 compliant devices, IEEE 802.11 compliant signals, or Bluetooth signals.

In an eighth implementation form of the UE according to the second aspect as such or any preceding implementation form of the second aspect, wherein the one or more processors further execute the instructions to select a first one of the first uplink channel or the second uplink channel when the channel quality is less than the first channel quality threshold, and select a second one of the first uplink channel or the second uplink channel when the channel quality is greater than the second channel quality threshold.

In a ninth implementation form of the UE according to the second aspect as such or any preceding implementation form of the second aspect, wherein the one or more processors further execute the instructions to update the historical information of successful uplink channel access attempts when the uplink random access procedure is successful.

According to a third aspect, a non-transitory computer-readable media storing computer instructions is provided. When executed by one or more processors, the instructions cause the one or more processors to perform the steps of measure a channel quality of a channel associated with a first uplink channel and a second uplink channel, determine that the channel quality is between a first channel quality threshold and a second channel quality threshold, and based thereon, select either the first uplink channel or the second uplink channel for an uplink transmission in accordance with a current location of a UE, historical information of successful uplink channel access attempts, and a distance threshold, and perform an uplink random access procedure in accordance with the selected uplink channel.

In a first implementation form of the non-transitory computer-readable media according to the third aspect as such, wherein the historical information comprises UE locations of successful uplink channel access attempts for the first uplink channel.

In a second implementation form of the non-transitory computer-readable media according to the third aspect as such or any preceding implementation form of the third aspect, wherein the one or more processors further execute the instructions to determine that a distance between the current location of the UE and any stored UE location in the historical information is smaller than the distance threshold, and based thereon select the first uplink channel.

In a third implementation form of the non-transitory computer-readable media according to the third aspect as such or any preceding implementation form of the third aspect, wherein the one or more processors further execute the instructions to determine that a distance between the current location of the UE and all stored UE location in the historical information is greater than or equal to the distance threshold, and based thereon select the second uplink channel.

In a fourth implementation form of the non-transitory computer-readable media according to the third aspect as such or any preceding implementation form of the third aspect, wherein the historical information comprises historical information of successful uplink channel access attempts for the second uplink channel.

In a fifth implementation form of the non-transitory computer-readable media according to the third aspect as such or any preceding implementation form of the third aspect, wherein the one or more processors further execute the instructions to determine that a distance between the current location of the UE and any stored UE location in the historical information is smaller than the distance threshold, and based thereon select the second uplink channel.

In a sixth implementation form of the non-transitory computer-readable media according to the third aspect as such or any preceding implementation form of the third aspect, wherein the one or more processors further execute the instructions to determine that a distance between the current location of the UE and all stored UE location in the historical information is greater than or equal to the distance threshold, and based thereon select the first uplink channel.

In a seventh implementation form of the non-transitory computer-readable media according to the third aspect as such or any preceding implementation form of the third aspect, wherein the one or more processors further execute the instructions to determine the current location of the UE from at least one of global positioning system (GPS) signals, information from IEEE 802.11 compliant devices, IEEE 802.11 compliant signals, or Bluetooth signals.

In an eighth implementation form of the non-transitory computer-readable media according to the third aspect as such or any preceding implementation form of the third aspect, wherein the one or more processors further execute the instructions to select a first one of the first uplink channel or the second uplink channel when the channel quality is less than the first channel quality threshold, and select a second one of the first uplink channel or the second uplink channel when the channel quality is greater than the second channel quality threshold.

In a ninth implementation form of the non-transitory computer-readable media according to the third aspect as such or any preceding implementation form of the third aspect, wherein the one or more processors further execute the instructions to update the historical information of successful uplink channel access attempts when the uplink random access procedure is successful.

An advantage of a preferred embodiment is that the selection of a supplemental uplink or normal uplink is based upon location information of the UE as well as channel quality metric. The addition of the location information in the uplink selection process helps to alleviate the misselection of the uplink.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
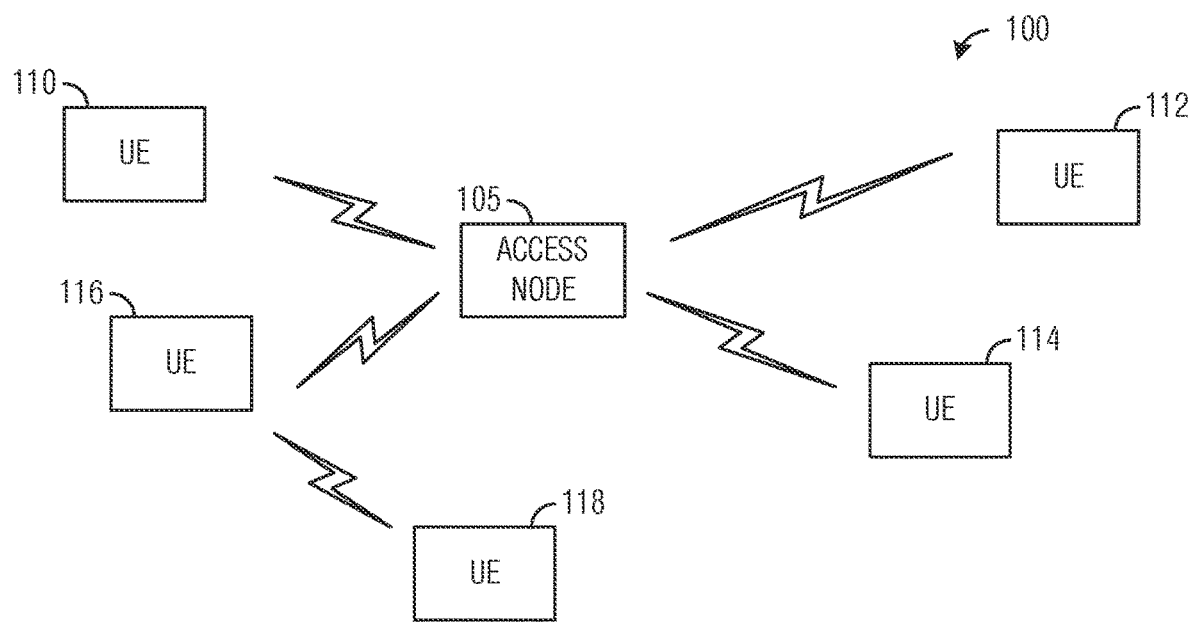
FIG. 1 illustrates an example wireless communications system.

FIG. 1 illustrates an example wireless communications system 100. Communications system 100 includes an access node 105 serving a plurality of user equipments (UEs) 110-118. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., long term evolution (LTE), LTE advanced (LTE-A), 5G, 5G NR, High Speed Packet Access (HSPA), Wi-Fi 802.11a/b/g/n/ac/ad/ax/ay, etc. While it is understood that communications systems may employ multiple access nodes capable of communicating with a number of UEs, only one access nodes, and a number of UEs are illustrated for simplicity.

In 5G NR, a supplementary uplink (SUL) is defined. A SUL carrier can be configured as a complement to a normal uplink (NUL) carrier. Both the SUL and the NUL carriers are associated with a particular downlink (DL) carrier, meaning that for a particular DL carrier, there exists a SUL and a NUL that corresponds to the DL carrier. In other words, if an access node is transmitting to a UE over a DL carrier, the access node also expects any uplink transmission from the UE to occur over either the NUL, SUL, or both NUL and SUL.

It is intended that the SUL compensates for a coverage gap between DL and uplink (UL) carriers. As an example, if both the DL carrier and the NUL carrier are at 3.5 GHz, the coverage of the DL carrier is usually larger than the coverage of the NUL because the access node has higher transmit power than the UE. In such a situation, a SUL carrier at 1.8 GHz, for example, will help to increase the coverage of the UL carriers because the pathloss at 1.8 GHz is lower than at 3.5 GHz. Hence, transmissions occurring over the SUL carrier can reach further distances than transmissions over the NUL carrier with the same UL transmission power.

Figure 2:
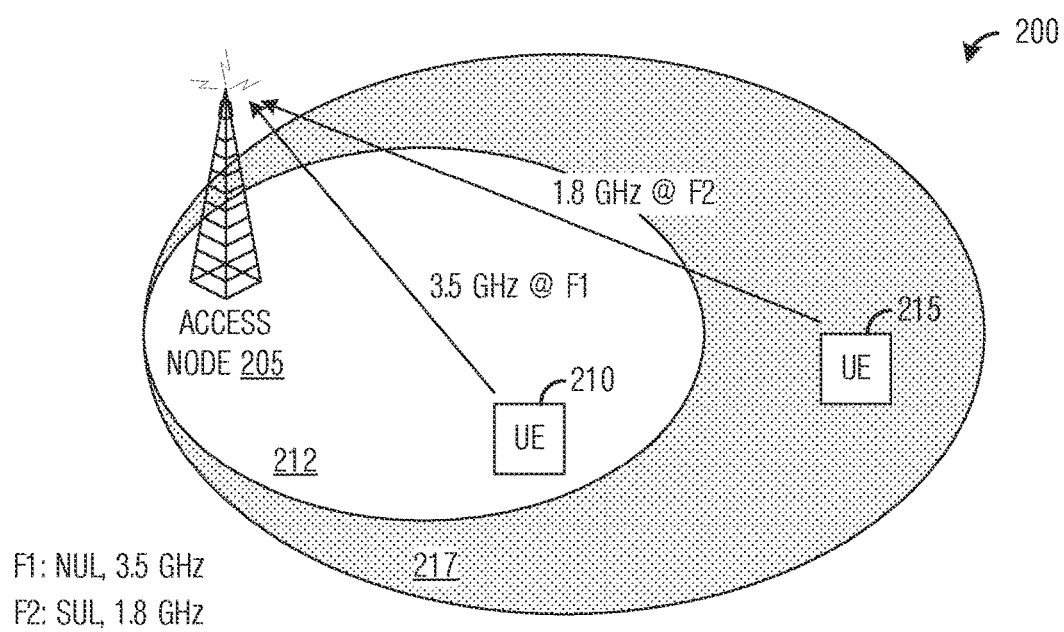
FIG. 2 illustrates an example communications system highlighting coverage differences between a SUL and a NUL with carriers at different operating frequencies.

FIG. 2 illustrates an example communications system 200 highlighting coverage differences between a SUL and a NUL with carriers at different operating frequencies. Communications system 200 includes an access node 205 and UEs 210 and 215. As shown in FIG. 2, UE 210 is transmitting to access node 205 over a NUL carrier at 3.5 GHz, which has an attendant coverage area 212, while UE 215 is transmitting to access node 205 over a SUL carrier at 1.8 GHz, which has an attendant coverage area 217. Coverage area 212 is smaller than coverage area 217, hence, transmission over a SUL compensates for a coverage gap between DL and UL carriers.

Figure 3:
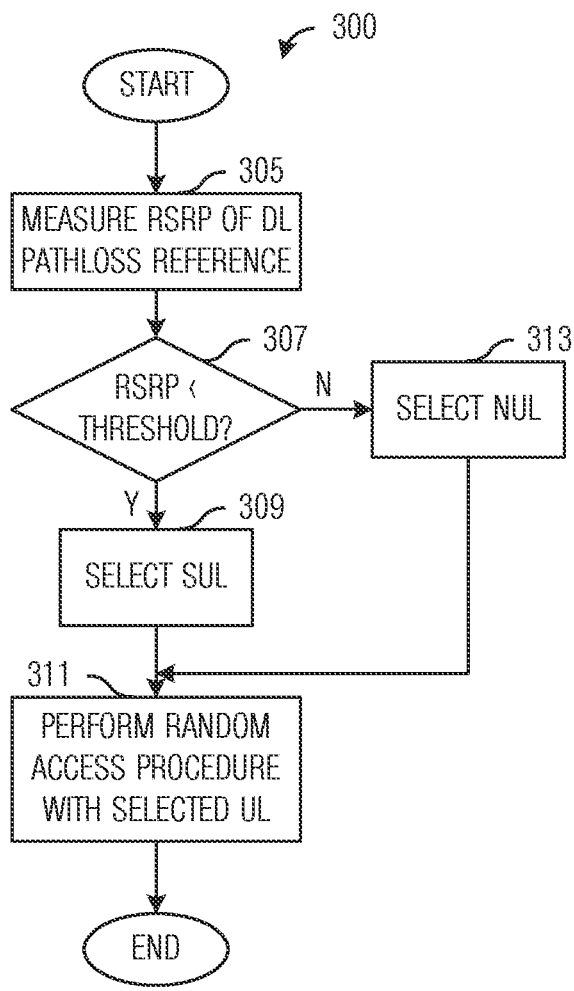
FIG. 3 illustrates a flow diagram of example operations occurring in a UE utilizing a prior art technique for selecting UL carrier.

FIG. 3 illustrates a flow diagram of example operations 300 occurring in a UE utilizing a prior art technique for selecting UL carrier. In 3GPP Technical Standard 38.321 entitled "3rd Generation Partnership Project; Technical Specification Group Radio Access Network; NR; Medium Access Control (MAC) Protocol Specification (Release 15)", version 15.1.0, which is hereby incorporated herein by reference, specifies the prior art technique for the selection of a UL carrier for random access. Operations 300 are indicative of operations occurring in a UE as the UE selects a UL carrier using a prior art technique.

Operations 300 begin with the UE making a measurement of a DL pathloss reference signal (block 305). The measurement of the DL pathloss reference signal may be a reference signal received power (RSRP) measurement. However, other measurements are possible, including reference signal received quality (RSRQ), signal to noise ratio (SNR), signal plus interference to noise ratio (SINR), received signal power, and so on. The UE performs a check to determine if the measurement of the DL pathloss reference signal is less than a specified threshold (block 307). The specified threshold sul-RSRP-Threshold is specified in 3GPP TS 38.321 and is cell-specific. If the measurement is less than the specified threshold, the UE selects the SUL (block 309). The UE performs a random access procedure using the SUL (block 311). If the measurement of the DL pathloss reference signal is not less than the specified threshold, the UE selects the NUL (block 313) and performs a random access procedure using the NUL (block 311).

However, the measurement of the DL pathloss reference signal may be subject to factors, such as, movement of the UE, shadowing of the UE caused by fluctuating blockage of the signal path, and so on. Therefore, the DL pathloss reference signal may be inaccurate and relying solely on the DL pathloss reference signal for UL selection may result in an incorrect selection. Furthermore, the cell-specific nature of the specified threshold might make the specified threshold unsuitable for all UEs within a single cell, and the use of an unsuitable threshold may result in an incorrect selection.

According to an example embodiment, a location of a UE, historical information of successful uplink channel access attempts, a distance threshold, and a channel quality measurement of a reference signal are used to select an UL for a transmission made by the UE. The historical information of successful uplink channel access attempts may include location information of the UE when the UE successfully made an uplink channel access attempt. The historical information of successful uplink channel access attempts may be arranged in a list form or tabular form, and may include UE location, time or date information, channel quality measurement, UL selection, and so forth. The channel quality measurement may be a measurement of a DL pathloss reference signal, where examples of the channel quality measurement include RSRP, RSRQ, SNR, SINR, received signal power, and so on. The channel quality measurement may also be based on an error rate, such as a packet error rate (PER), a bit error rate (BER), a frame error rate (FER), and so on. The inclusion of the location of the UE and the historical information of successful uplink channel access attempts with the channel quality measurement in the selection of the UL helps to prevent situations where the mobility of the UE or signal shadowing can lead to erroneous channel quality measures and an incorrect selection.

The distance threshold enables a margin of error in the using of the location of the UE and the historical information of successful uplink channel access attempts in the UL selection process. The distance thresholds allows for the use of locations that do not exactly match any of the historical information, but are within the distance threshold of a location stored in the historical information. The distance threshold may be adjusted to alter UL selection performance. As an example, if the distance threshold is set to a small value, then the UL selection performance may be more accurate but with a reduction in the impact of the historical information due to fewer matches with locations stored in the historical information. If the distance threshold is set to a large value, then the UL selection performance may be less accurate but with an increase in the impact of the historical information due to more matches with locations stored in the historical information. In an embodiment, if the location of the UE and any location stored in the historical information where the UE successfully used a SUL for a random access procedure are within the distance threshold, then the UE will select the SUL. In an embodiment, if the location of the UE and any location stored in the historical information where the UE successfully used a NUL for a random access procedure are within the distance threshold, then the UE will select the NUL.

Figure 4:
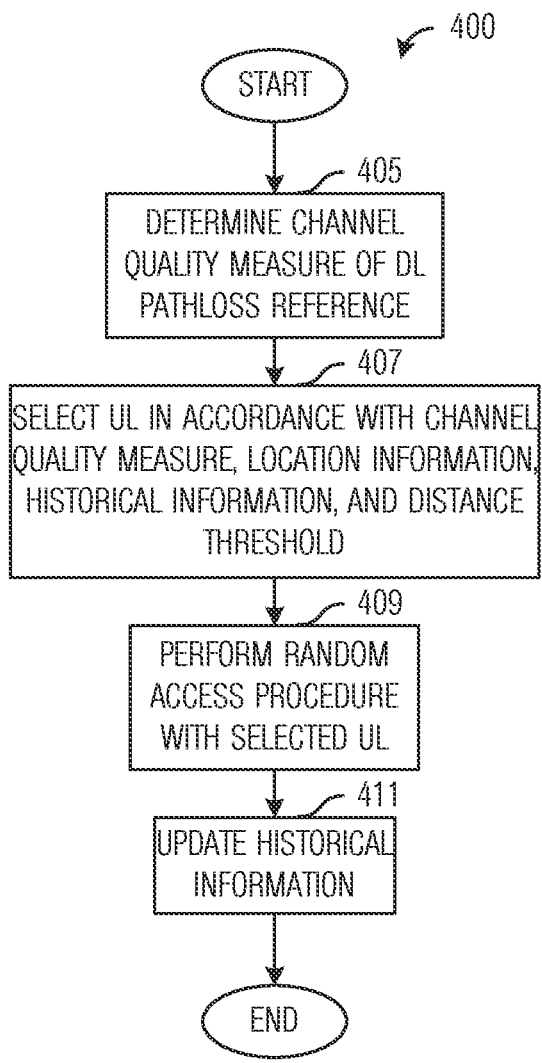
FIG. 4 illustrates a flow diagram of example operations occurring in a UE selecting a UL according to example embodiments presented herein.

FIG. 4 illustrates a flow diagram of example operations 400 occurring in a UE selecting a UL. Operations 400 may be indicative of operations occurring in a UE as the UE selects an UL.

Operations 400 begin with the UE determining a channel quality measure of a DL pathloss reference (block 405). The UE may measure the channel quality of the DL pathloss reference signal, for example. Examples of the measures include RSRP, RSRQ, SNR, SINR, received signal power, and so on. The DL pathloss reference signal may be a dedicated reference signal or any other reference signal transmitted by the access node. The UE selects a UL in accordance with the channel quality measure, a location of the UE, and historical information (block 407). The UE uses the channel quality measure, along with the location of the UE and any historical information to select a UL. As an example, the UE selects either a SUL or a NUL using the channel quality measure, along with the location of the UE and any historical information. The selection of the UL may also be in accordance with a distance threshold. Detailed descriptions of example embodiments of the UL selection process is provided below. The UE performs a random access procedure with the selected UL (block 409). The UE may transmit a random access preamble in the selected UL to initiate the random access procedure, for example. Additional UL transmissions made by the UE during the random access procedure may occur in the selected UL. The UE updates the historical information (block 411). As an example, if the random access procedure succeeded, the UE updates the historical information with an entry that includes the location of the UE, the selected UL, time or date information, and so on. As an example, if the random access procedure failed, the UE updates the historical information with an entry that includes the location of the UE, the selected UL, time or date information, and so on.

Figure 5:
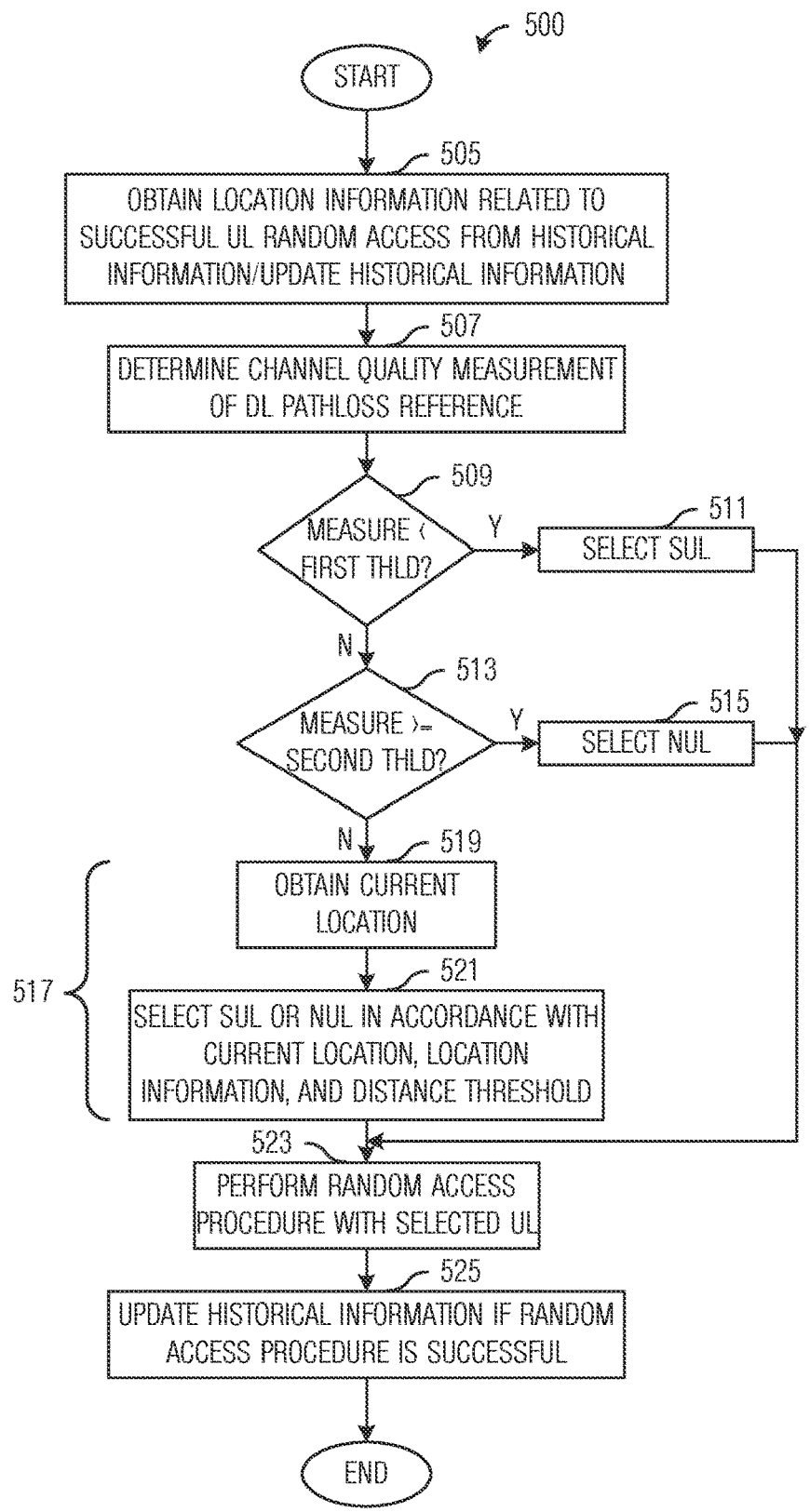
FIG. 5 illustrates a flow diagram of example operations occurring in a UE selecting a SUL or a NUL in accordance with the location of the UE, the historical information of successful uplink channel access attempts, a distance threshold, and the channel quality measurement of a DL pathloss reference signal according to example embodiments presented herein.

FIG. 5 illustrates a flow diagram of example operations 500 occurring in a UE selecting a SUL or a NUL in accordance with the location of the UE, the historical information of successful uplink channel access attempts, a distance threshold, and the channel quality measurement of a DL pathloss reference signal. Operations 500 may be indicative of operations occurring in a UE as the UE selects a SUL or a NUL accordance with the location of the UE, the historical information of successful uplink channel access attempts, a distance threshold, and the channel quality measurement of a DL pathloss reference signal.

Operations 500 begin with the UE obtaining location information related to successful uplink random access attempts from the historical information (block 505). The historical information may be provided to the UE during an initial attachment process or during a handover process. The historical information may be stored in the memory of the UE. Alternatively, the UE may retrieve the historical information from a server. As an example, the UE may be configured to periodically retrieve the historical information from the server. As another example, the UE may be configured to retrieve the historical information during an initial attachment process or during a handover process. The UE may also update the historical information. As an example, during the initial attachment process or handover procedure, the UE provides its historical information. The UE determines a channel quality measurement of the DL pathloss reference signal (block 507). The DL pathloss reference signal may be periodically transmitted by the access node. The DL pathloss reference signal may be a dedicated reference signal or any other reference signal transmitted by the access node.

The UE performs a check to determine if the channel quality measurement is less than a first specified threshold (block 509). In an embodiment, the first specified threshold is the sul-RSRP-Threshold. In an embodiment, the first specified threshold is a combination of the sul-RSRP-Threshold and another threshold DL_RSRP_Offset, such as sul-RSRP-Threshold−DL_RSRP_Offset. If the channel quality measurement is less than the first specified threshold, the UE selects the SUL (block 511). In other words, if the channel quality is very poor, select the SUL with its greater coverage.

If the channel quality measurement is not less than the first specified threshold, the UE performs another check to determine if the channel quality measurement is greater than or equal to a second specified threshold (block 513). In an embodiment, the second specified threshold is a combination of the sul-RSRP-Threshold and another threshold DL_RSRP_Offset, such as sul-RSRP-Threshold+DL_RSRP_Offset. If the channel quality measurement is greater than or equal to the second specified threshold, the UE selects the NUL (block 515). In other words, if the channel quality is very good, select the NUL with its potentially greater bandwidth and lesser interference.

If the channel quality measurement is not less than the first specified threshold and not greater than or equal to the second specified threshold, the UE selects either the SUL or NUL in accordance with the location of the UE, location information related to successful random access obtained from historical information, and a distance threshold (blocks 517). In other words, when the channel quality measurement is in a range where it is not clear cut to select either the SUL or NUL, the UE uses additional information (e.g., the location of the UE, location information related to successful random access obtained from historical information, and a distance threshold) to select the SUL or NUL. The additional information helps to increase the probability that the UE selects the correct UL, i.e., the UL that yields better coverage for the UE.

The UE obtains its location (block 519). In an embodiment, the UE obtains its location from a positioning system, such as a Global Positioning System (GPS). In an embodiment, the UE obtains its location from Wi-Fi (i.e., IEEE 802.11 compliant communications system) related information from an access point (AP) operating in close proximity. As example, the UE obtains a basic service set identifier (BSSID) of the AP, or a DL measured received power (e.g., a DL received signal strength indicator (RSSI)) of the AP. In an embodiment, the UE obtains its location from a positioning system and Wi-Fi related information. In an embodiment, the UE obtains its location from Wi-Fi signals from the AP and accessing a Wi-Fi signal fingerprint database. In an embodiment, the UE obtains its location from signals of other types of communications systems, such as Bluetooth compliant communications systems.

The UE selects either the SUL or the NUL in accordance with the location of the UE, location information obtained from historical information, and a distance threshold (block 521). In an embodiment, the UE compares a difference between the location of the UE and any of the locations stored in the historical information with the distance threshold, and selects either the SUL or the NUL based on the result of the comparison.

Figure 6:
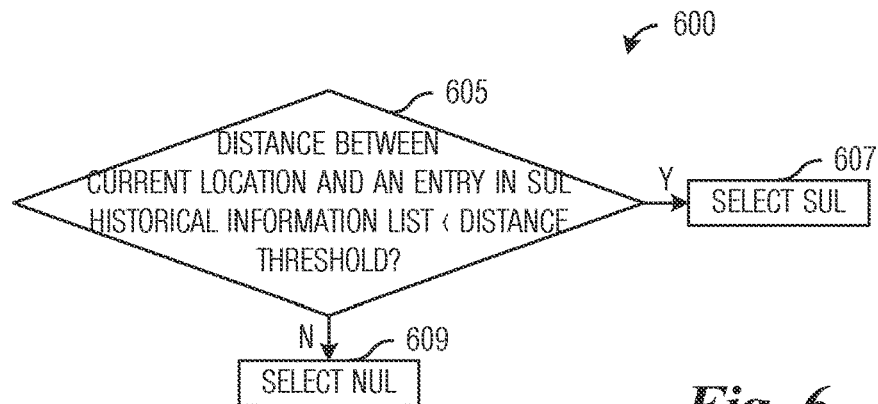
FIG. 6 illustrates a flow diagram of example operations occurring in a UE selecting a SUL or NUL when the historical information stores entries for successful random access attempts on a SUL according to example embodiments presented herein.

As an example, in a situation wherein the historical information stored location information related to successful random access attempts on SULs, the UE selects the SUL if the difference between the location of the UE and any of the locations stored in the historical information is less than the distance threshold. FIG. 6 illustrates a flow diagram of example operations 600 occurring in a UE selecting a SUL or NUL when the historical information stores entries for successful random access attempts on a SUL. The UE compares a distance between the location of the UE with any of the locations stored in the historical information with the distance threshold (block 605). If the distance is less than the distance threshold, the UE selects the SUL (block 607). If the distance is not less than the distance threshold, the UE selects the NUL (block 609).

Figure 7:
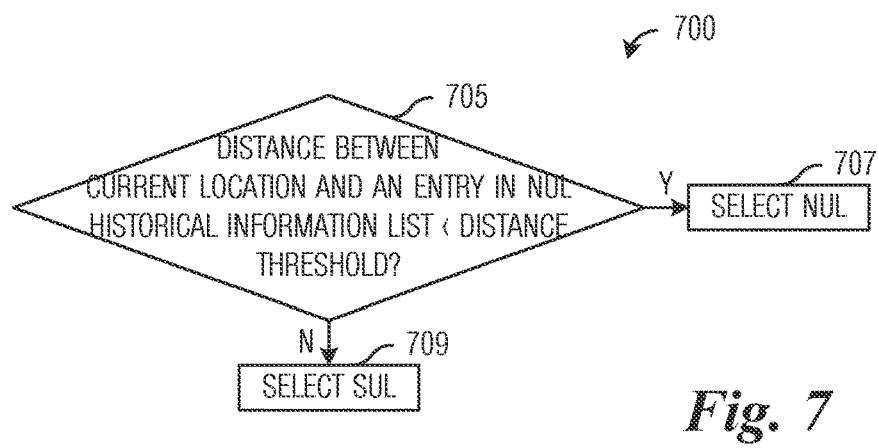
FIG. 7 illustrates a flow diagram of example operations occurring in a UE selecting a SUL or NUL when the historical information stores entries for successful random access attempts on a NUL according to example embodiments presented herein.

Referring back now to FIG. 5, as an example, in a situation wherein the historical information stored location information related to successful random access attempts on NULs, the UE selects the NUL if the difference between the location of the UE and any of the locations stored in the historical information is less than the distance threshold. FIG. 7 illustrates a flow diagram of example operations 700 occurring in a UE selecting a SUL or NUL when the historical information stores entries for successful random access attempts on a NUL. The UE compares a distance between the location of the UE with any of the locations stored in the historical information with the distance threshold (block 705). If the distance is less than the distance threshold, the UE selects the NUL (block 707). If the distance is not less than the distance threshold, the UE selects the SUL (block 709).

Referring back now to FIG. 5, after the UL is selected (i.e., a SUL in block 511, a NUL in block 515, or either a SUL or NUL in block 521), the UE performs a random access procedure with the selected UL (block 523). As an example, the UE transmits a random access preamble over the selected UL to initiate the random access procedure. Additional UL transmissions made by the UE during the random access procedure may occur in the selected UL. The UE updates its historical information if the random access procedure is successful (block 525). As an example, the UE stores its location, time or date, channel quality measurement, and so on, in an entry of the historical information.

An example UL selection procedure utilizing positioning system information is as follows:

At a time instance, e.g., time T, the UE determines that it has successfully selected a SUL for making an UL transmission, which includes performing a random access procedure. The determination may be based on one or more of the following factors A comparison of a measured DL RSRP with a specified quality threshold, e.g., the measured DL RSRP is less than the specified quality threshold; or A comparison of a PER of a data packet transmission occurring after the random access procedure with a specified error threshold, e.g., the PER is less than the specified error threshold.

If the UE has access to a positioning system when the UE selected the SUL, the UE obtains its current location information from the positioning system and stores the current location information.

The current location information is historical information and is stored in a list. The list includes information related to locations where the UE has successfully selected the SUL for performing random access procedures.

At a time after time T, when the UE has a need to perform a random access procedure, e.g., the UE has data to transmit, the UE measures the DL RSRP and compares the measured DL RSRP with specified thresholds.

If the measured DL RSRP is less than a first specified threshold, the UE selects the SUL for performing the random access procedure;

If the measured DL RSRP is greater than or equal to a second specified threshold, the UE selects the NUL for performing the random access procedure;

If the measured DL RSRP is greater than the first specified threshold but less than the second specified threshold, the UE compares its current location information with the location information stored in the list (i.e., the historical information). If there is a distance difference between the current location information and any one of the location information stored in the list that is less than a specified distance threshold, the UE selects the SUL for performing the random access procedure, else the UE selects the NUL for performing the random access procedure.

The UE updates the list (i.e., the historical information) if the random access procedure using the SUL is successful.

The example presented above makes use of not only the measured DL RSRP measurement, but current and historical location information in the selection of a SUL, where the current location information is obtained from a positioning system. Other example embodiments presented herein obtain current location information using other techniques, as well as selecting a NUL instead of a SUL, utilizing different thresholds, and so on.

Figure 8:
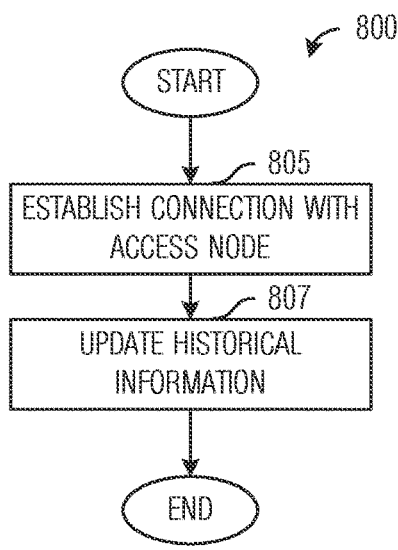
FIG. 8 illustrates a flow diagram of example operations occurring in a UE updates historical information according to example embodiments presented herein.

FIG. 8 illustrates a flow diagram of example operations 800 occurring in a UE updates historical information. Operations 800 may be indicative of operations occurring in a UE as the UE updates historical information.

Operations 800 begin with the UE establishing a connection with the access node (block 805). The establishment of the connection may occur during initial attachment or during a handover procedure. The connection may also be established when the UE wakes up from a sleep mode. The UE updates the historical information (block 807). The UE may retrieve updates to the historical information from the access node or a server storing the historical information. The UE may provide updates to the historical information to the access node or the server storing the historical information.

Figure 9:
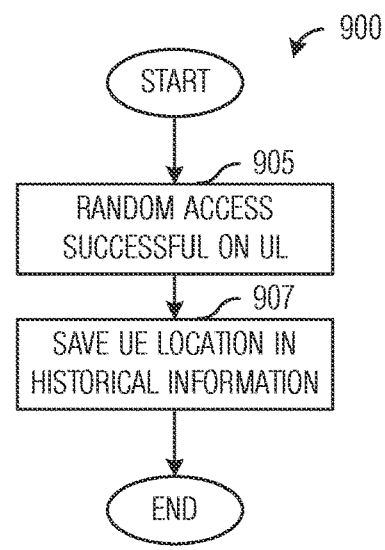
FIG. 9 illustrates a flow diagram of example operations occurring in a UE generating historical information according to example embodiments presented herein.

FIG. 9 illustrates a flow diagram of example operations 900 occurring in a UE generating historical information. Operations 900 may be indicative of operations occurring in a UE as the UE generates historical information.

Operations 900 begin with the UE performing a successful random access attempt on an UL (block 905). The UE saves the location of the UE in historical information (block 907). The UE may determine the location of the UE from positioning system information, Wi-Fi information, a combination of positioning system information and Wi-Fi information, or Wi-Fi (or other communications system) signal fingerprints. The UE saves the location of the UE in an entry that may include the location of the UE, time or date information, channel quality information, and so on.

Figure 10:
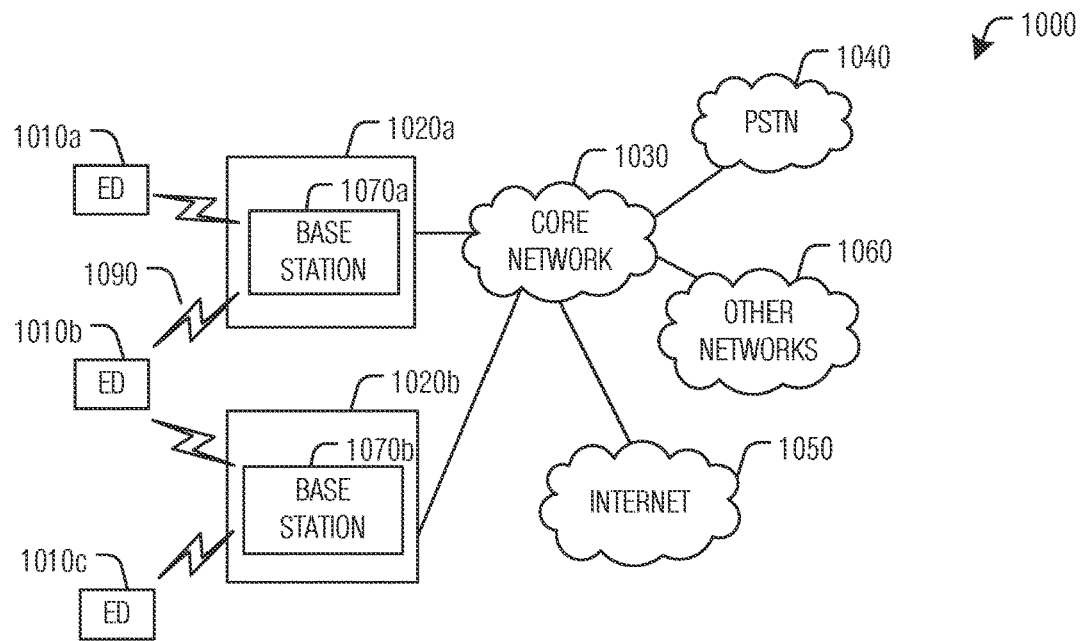
FIG. 10 illustrates an example communication system according to example embodiments presented herein.

FIG. 10 illustrates an example communication system moo. In general, the system 1000 enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1000 includes electronic devices (ED) 1010a-1010c, radio access networks (RANs) 1020a-1020b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate or communicate in the system 1000. For example, the EDs 1010a-1010c are configured to transmit or receive via wireless or wired communication channels. Each ED 1010a-1010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, or the other networks 1060. For example, the base stations 1070a-1070b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1010a-1010c are configured to interface and communicate with the Internet 1050 and may access the core network 1030, the PSTN 1040, or the other networks 1060.

In the embodiment shown in FIG. 10, the base station 1070a forms part of the RAN 1020a, which may include other base stations, elements, or devices. Also, the base station 1070b forms part of the RAN 1020b, which may include other base stations, elements, or devices. Each base station 1070a-1070b operates to transmit or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
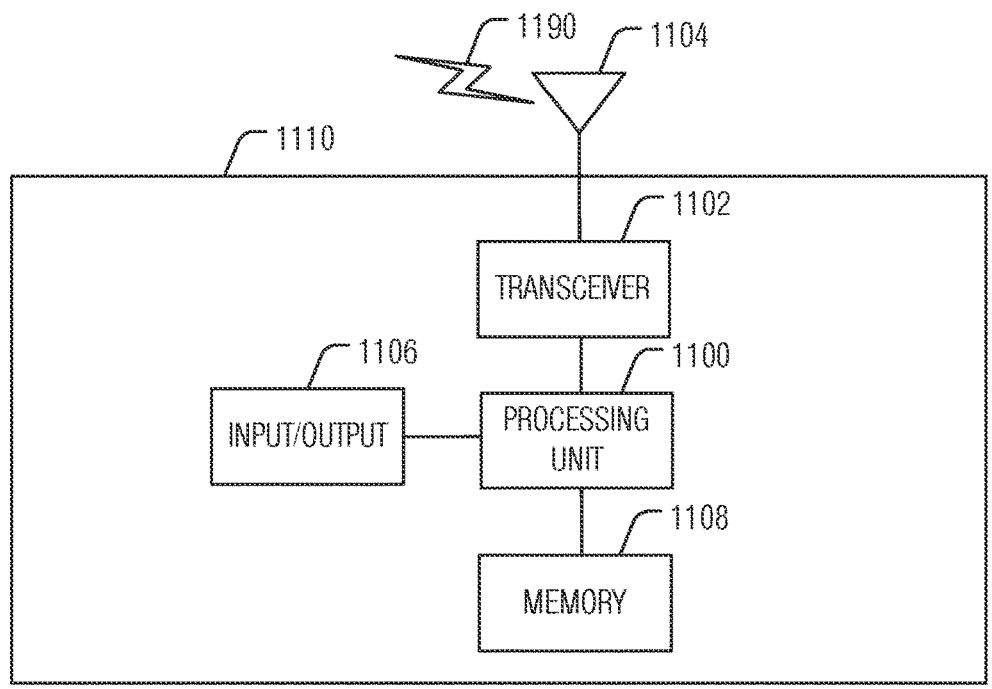
FIGS. 11A and 11B illustrate example devices that may implement the methods and teachings according to this disclosure.
Figure 11B:
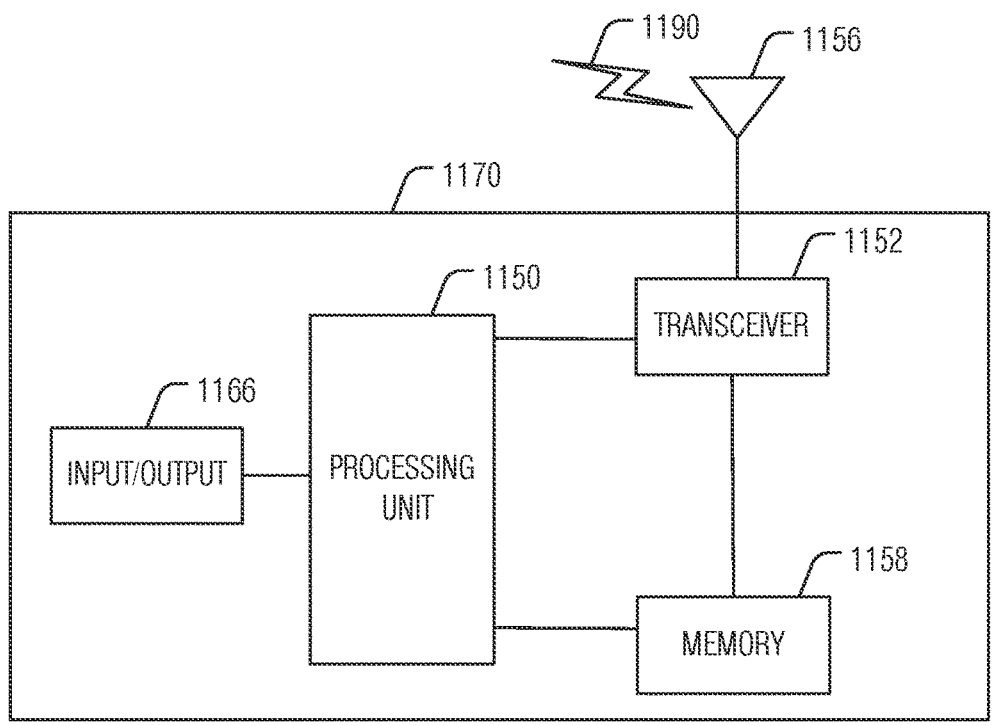

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system moo. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
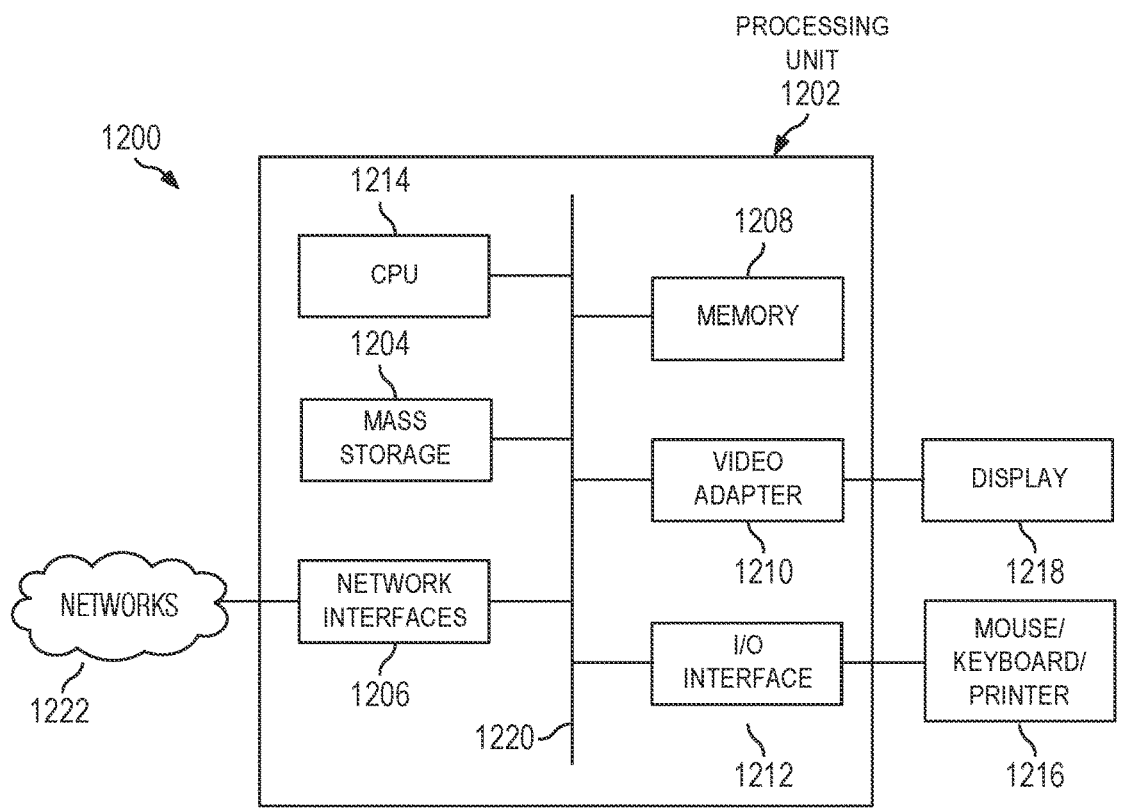
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse, keyboard, or printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit or module, a performing unit or module, a determining unit or module, a measuring unit or module, a retrieving unit or module, or an updating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a user equipment (UE), the method comprising:
   measuring, by the UE, a channel quality of a channel associated with a first uplink channel and a second uplink channel;
   determining, by the UE, that the channel quality is between a first channel quality threshold and a second channel quality threshold, the first channel quality threshold being less than the second channel quality threshold;
   based on the determining,
      selecting, by the UE, either the first uplink channel or the second uplink channel for an uplink transmission in accordance with a current location of the UE, historical information of successful uplink channel access attempts, and a distance threshold, and
      performing, by the UE, an uplink random access procedure in accordance with the selected uplink channel; and
   retrieving, by the UE, an update of the historical information of successful uplink channel access attempts from a server, or updating, by the UE, the historical information of successful uplink channel access attempts when the uplink random access procedure is successful.

2. The method of claim 1, wherein the historical information comprises UE locations of successful uplink channel access attempts for the first uplink channel.

3. The method of claim 1, wherein the selecting either the first uplink channel or the second uplink channel comprises:
   determining, by the UE, that a distance between the current location of the UE and any stored UE location in the historical information is smaller than the distance threshold, and based thereon selecting, by the UE, the first uplink channel.

4. The method of claim 1, wherein the selecting either the first uplink channel or the second uplink channel comprises:
   determining, by the UE, that a distance between the current location of the UE and all stored UE location in the historical information is greater than or equal to the distance threshold, and based thereon selecting, by the UE, the second uplink channel.

5. The method of claim 1, wherein the historical information comprises historical data of successful uplink channel access attempts for the second uplink channel.

6. The method of claim 1, further comprising:
determining, by the UE, the current location of the UE from at least one of global positioning system (GPS) signals, information from IEEE 802.11 compliant devices, IEEE 802.11 compliant signals, or Bluetooth signals.

7. The method of claim 1, further comprising:
selecting, by the UE, the first uplink channel based on that the channel quality is less than the first channel quality threshold; and
selecting, by the UE, the second uplink channel based on that the channel quality is greater than the second channel quality threshold.

8. The method of claim 1, wherein the first uplink channel and the second uplink channel are in different frequency bands.

9. The method of claim 1, the second channel quality threshold equaling the first channel quality threshold plus a specified offset.

10. A user equipment (UE) comprising:
a non-transitory memory storage comprising instructions; and
one or more processors in communication with the non-transitory memory storage, wherein the one or more processors execute the instructions to perform operations including:
measuring a channel quality of a channel associated with a first uplink channel and a second uplink channel,
determining that the channel quality is between a first channel quality threshold and a second channel quality threshold, the first channel quality threshold being less than the second channel quality threshold,
based on the determining,
selecting either the first uplink channel or the second uplink channel for an uplink transmission in accordance with a current location of the UE, historical information of successful uplink channel access attempts, and a distance threshold, and
performing an uplink random access procedure in accordance with the selected uplink channel, and
retrieving an update of the historical information of successful uplink channel access attempts from a server, or updating the historical information of successful uplink channel access attempts when the uplink random access procedure is successful.

11. The UE of claim 10, wherein the historical information comprises UE locations of successful uplink channel access attempts for the first uplink channel.

12. The UE of claim 10, wherein the selecting either the first uplink channel or the second uplink channel comprises:
determining that a distance between the current location of the UE and any stored UE location in the historical information is smaller than the distance threshold, and based thereon select the first uplink channel.

13. The UE of claim 10, wherein the selecting either the first uplink channel or the second uplink channel comprises:
determining that a distance between the current location of the UE and all stored UE location in the historical information is greater than or equal to the distance threshold, and based thereon select the second uplink channel.

14. The UE of claim 10, wherein the historical information comprises historical data of successful uplink channel access attempts for the second uplink channel.

15. The UE of claim 10, the operations further comprising:
determining the current location of the UE from at least one of global positioning system (GPS) signals, information from IEEE 802.11 compliant devices, IEEE 802.11 compliant signals, or Bluetooth signals.

16. The UE of claim 10, the operations further comprising:
selecting the first uplink channel based on that the channel quality is less than the first channel quality threshold, and
selecting the second uplink channel based on that the channel quality is greater than the second channel quality threshold.

17. A non-transitory computer-readable media storing computer instructions, that when executed by one or more processors of a user equipment (UE), cause the UE to perform operations including:
measuring a channel quality of a channel associated with a first uplink channel and a second uplink channel,
determining that the channel quality is between a first channel quality threshold and a second channel quality threshold, the first channel quality threshold being less than the second channel quality threshold,
based on the determining,
selecting either the first uplink channel or the second uplink channel for an uplink transmission in accordance with a current location of the UE, historical information of successful uplink channel access attempts, and a distance threshold, and
performing an uplink random access procedure in accordance with the selected uplink channel, and
retrieving an update of the historical information of successful uplink channel access attempts from a server, or updating the historical information of successful uplink channel access attempts when the uplink random access procedure is successful.

18. The non-transitory computer-readable media of claim 17, wherein the historical information comprises UE locations of successful uplink channel access attempts for the first uplink channel.

19. The non-transitory computer-readable media of claim 17, wherein the selecting either the first uplink channel or the second uplink channel comprises:
determining that a distance between the current location of the UE and any stored UE location in the historical information is smaller than the distance threshold, and based thereon select the first uplink channel.

20. The non-transitory computer-readable media of claim 17, wherein the selecting either the first uplink channel or the second uplink channel comprises:
determining that a distance between the current location of the UE and all stored UE location in the historical information is greater than or equal to the distance threshold, and based thereon select the second uplink channel.

21. The non-transitory computer-readable media of claim 17, wherein the historical information comprises historical data of successful uplink channel access attempts for the second uplink channel.

22. The non-transitory computer-readable media of claim 17, the operations further comprising:
determining the current location of the UE from at least one of global positioning system (GPS) signals, information from IEEE 802.11 compliant devices, IEEE 802.11 compliant signals, or Bluetooth signals.

23. The non-transitory computer-readable media of claim 17, the operations further comprising:
selecting the first uplink channel based on that the channel quality is less than the first channel quality threshold, and
selecting the second uplink channel based on that the channel quality is greater than the second channel quality threshold.

24. The non-transitory computer-readable media of claim 17, the operations further comprising:
updating the historical information of successful uplink channel access attempts when the uplink random access procedure is successful.

* * * * *